US006942331B2

United States Patent
Guillen et al.

(10) Patent No.: US 6,942,331 B2
(45) Date of Patent: Sep. 13, 2005

(54) PRINTING APPARATUS AND METHOD

(75) Inventors: Robert Guillen, Sabadell (ES); Francisco Javier Pozuelo, Barcelona (ES); Frederic Simon Van Heeswijk, Bathmen (NL); Joan Matias Guerra, Barcelona (NL)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/437,977

(22) Filed: May 15, 2003

(65) Prior Publication Data

US 2004/0036755 A1 Feb. 26, 2004

(30) Foreign Application Priority Data

May 17, 2002 (GB) .............................. 0211251

(51) Int. Cl.[7] .......................... B41J 29/00; B32B 31/04
(52) U.S. Cl. .................. 347/104; 347/212; 400/120.18; 156/250; 156/353; 156/358; 156/361; 156/384
(58) Field of Search ................................ 156/250, 353, 156/358, 361, 384, 387, 510; 400/120.18; 347/104, 212

(56) References Cited

U.S. PATENT DOCUMENTS

| | | | | |
|---|---|---|---|---|
| 4,743,325 A | * | 5/1988 | Miyake ...................... | 156/250 |
| 5,120,386 A | * | 6/1992 | Seki et al. ................... | 156/250 |
| 5,211,800 A | * | 5/1993 | Taguchi et al. ............. | 156/521 |
| 5,316,609 A | * | 5/1994 | Guither et al. .............. | 156/301 |
| 5,368,677 A | * | 11/1994 | Ueda et al. .................. | 156/362 |
| 6,264,296 B1 | | 7/2001 | Klinefelter et al. | |
| 6,517,200 B1 | * | 2/2003 | Ramaswamy et al. ...... | 347/104 |
| 6,561,248 B2 | * | 5/2003 | Sasaki et al. ............... | 156/521 |
| 6,585,366 B2 | | 7/2003 | Nagata et al. | |
| 2002/0027586 A1 | * | 3/2002 | Kikuchi et al. ............. | 347/104 |

* cited by examiner

Primary Examiner—Andrew H. Hirshfeld
Assistant Examiner—Jill E. Culler
(74) Attorney, Agent, or Firm—Foley & Lardner LLP

(57) ABSTRACT

A printing apparatus comprises a printer, a laminator device and feeding means for feeding to said laminator device, in an integrated operation, media that is outputted from said printer, said laminator device comprising lamination means which cause at least one lamination film to be applied on the media, wherein the apparatus comprises means for causing the advance of a portion of media through the laminator device while maintaining inactive said lamination means, in order to perform lamination only on selected portions of the print media.

The apparatus is versatile and may work most of the time in unattended operation.

4 Claims, 5 Drawing Sheets

PRINTING APPARATUS AND METHOD

The present invention relates to a printing apparatus which comprises a laminator device that allows lamination of print media, and to a method for printing and laminating media.

BACKGROUND OF THE INVENTION

Known in the state of the art are laminator apparatus which allow lamination or plastification of a picture or other plot, i.e. cover it with at least one layer of a protective film which is generally a transparent plastic film.

In order to laminate a plot printed in a printing apparatus, prior art devices required the user to wait until the end of the printing operation, manually take the printed plot from the printer to a stand-alone laminator, and carefully introduce the plot into the latter.

This method has the drawback of requiring user intervention between the printing and the laminating operations, especially in the case of professional use of the devices when it is also costly.

Also known, e.g. from U.S. Pat. No. 6,264,296, is a small format ID card printer which includes a laminating station; each ID card is printed and dried and then fed to the laminating station.

It would be desirable to have a more versatile apparatus, e.g. an apparatus which can be used for printing and laminating plots of different sizes, and this in unattended manner.

In particular, it would be desirable to be able to perform in-line lamination for different lengths of plot especially in large format printing apparatus, such as inkjet plotters.

In this kind of apparatus, handling of the media is in itself complicated due to its size and behaviour, and in-line lamination adds to the problems to be solved; furthermore, since these printers are generally for professional use, it is desirable to provide enhanced versatility and unattended operation as far as possible.

On the other hand, it would be desirable to have an apparatus in which these advantages can be achieved using different printing and laminating techniques, including for example hot lamination.

DESCRIPTION OF THE INVENTION

According to a first aspect, the invention relates to a printing apparatus comprising a printer, a laminator device and feeding means for feeding to said laminator device, in an integrated operation, media that is outputted from said printer, said laminator device comprising lamination means which cause at least one lamination film to be applied on the media, wherein the apparatus comprises means for causing the advance of a portion of media through the laminator device while maintaining inactive said lamination means, in order to perform lamination only on selected portions of the print media.

Such an apparatus is highly versatile. It allows working with media and plots of a wide range of lengths and to obtain products with different finishing, and thus different degrees of cost and quality.

Said means for causing the advance of a portion of media through the laminator device while maintaining inactive said lamination means may comprise cutting means for cutting said lamination film, such that the media advances through the laminator without film being applied thereto.

The apparatus may further comprise means for outputting unprinted media from the printer, and means for drawing back media from the laminator device towards the printer after cutting the lamination film.

The output of unprinted or blank media from the printer allows completion of the laminating operation of the last printed plot, when the next plot is not ready to be printed. Providing for the draw back of media towards the printer avoids the waste of the outputted blank media, which can be quite costly in large format devices.

The draw back of media towards the printer is made possible because the film has been cut; film cutting therefore also contributes to avoiding media waste.

In one embodiment, the media between the printer and the laminator device forms a loose media buffer. The buffer avoids tension on the media and allows to compensate the different advance speed profiles of the printer and the laminator.

In one embodiment, the laminator device is arranged substantially below the printer.

This layout saves floor space and allows to feed the print media to the laminator device keeping the printed side facing outwards, reducing the risk of contact with surfaces of the apparatus.

The media may be a web of media on which are printed several consecutive plots.

In one embodiment, the printer is an inkjet printer.

In one embodiment, said printer is a large-format printer which is able to handle media of a width of more than 24 inches.

According to a further aspect, the invention also relates to a laminator device, said device being built as a kit which can be attached to a printing apparatus as described above.

According to one further aspect, the invention relates to a method for printing and laminating media, comprising printing on a media in a printer, feeding at least part of said print media to a laminator device in an integrated operation, and performing lamination only on selected portions of said print media by causing the advance of a portion of media through the laminator device while maintaining inactive lamination means of said laminator device.

BRIEF DESCRIPTION OF THE DRAWINGS

Particular embodiments of the present invention will be described in the following, only by way of non-limiting example, with reference to the appended drawings, in which.

DESCRIPTION OF PREFERRED EMBODIMENTS

Figure 1:
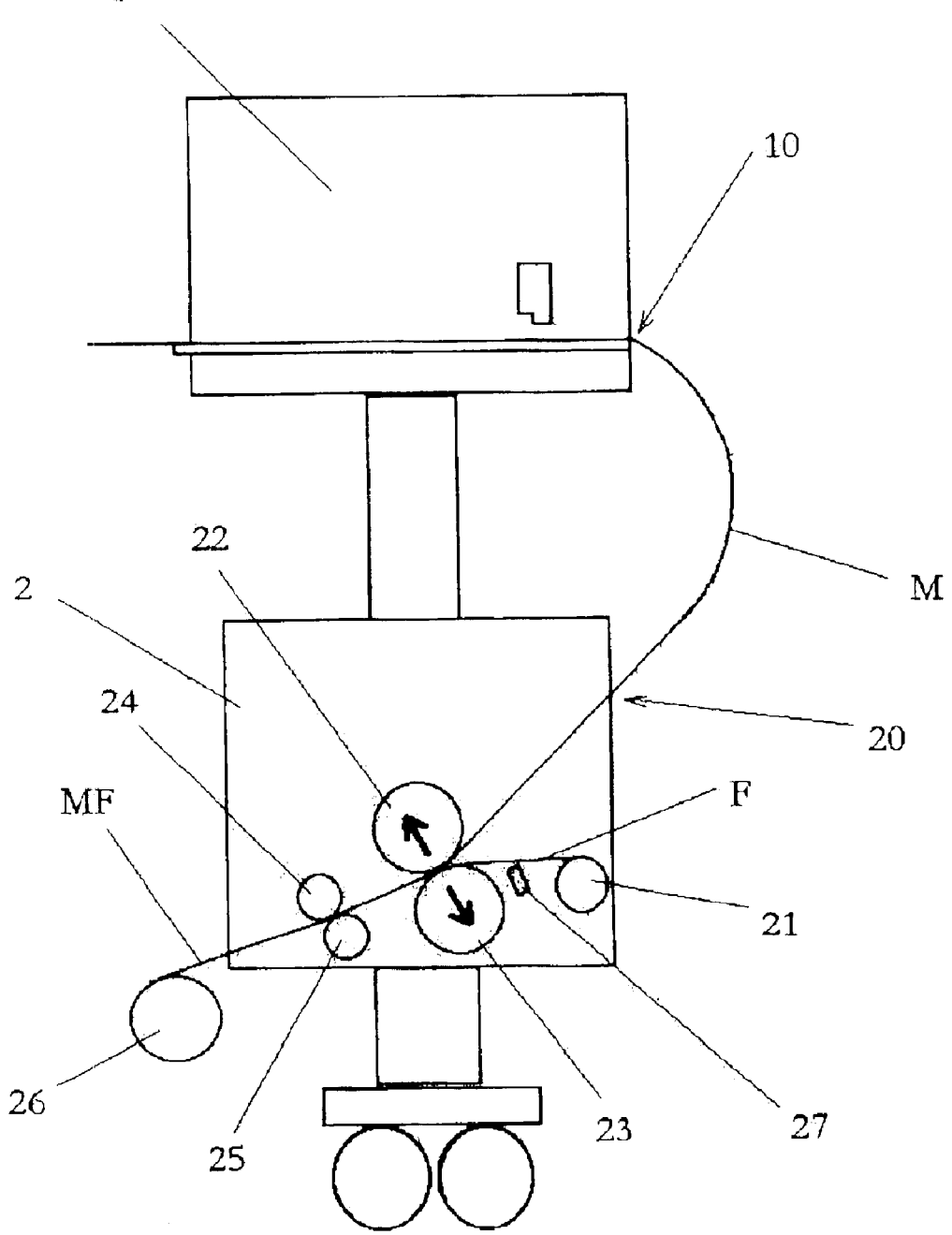
FIG. 1 is a schematic view in side elevation of a printing device according to an embodiment of the invention.

FIG. 1 shows an embodiment of the present invention in which a printing device 1, for example an inkjet printer, is provided with a laminator device 2 in one integrated apparatus. The laminator will usually perform a thermally activated operation, but it could also use any other kind of process, including cold lamination.

By 'integrated' apparatus it is here meant that the devices 1 and 2 may operate in succession, a media being able to pass from one device to the other, such that the media may be printed and thereafter laminated by the apparatus in a continuous operation, without normally requiring manual intervention.

The printer and the laminator may exchange commands, for example electronically, and the two devices may be physically combined by means of mechanical linkages.

In the figure, a media M is printed in the printing device 1 and leaves through the outlet 10 thereof, and is then fed to the laminator 2 through its inlet 20; the media M is kept loose in the region between the printer and the laminator, forming a buffer that allows to accommodate the different speed profiles of the printer and the laminator.

In this regard, it should be noted that in order to avoid defects the laminator should not be stopped in the middle of a plot; a stop during lamination is especially undesirable in the case of thermally activated lamination, since the media and lamination film would be locally subject to an excess of heat. In contrast, the printing operation may be incremental, for example in the case of an inkjet printer with a reciprocating carriage.

Furthermore, the length of media M between the printer and the laminator is preferably not under tension: since the process works in a continuous manner, i.e. the printer may be printing while the laminator is laminating, it is advisable to avoid 'pulling' the media out of the printer, because this could cause defects in the plot being printed.

The laminator holds at least a roll 21 of a suitable film F; such a film F may comprise a layer of plastic material and a layer of thermally activable adhesive. There can also be a second roll of film (not shown), if it is desired to laminate both sides of the media.

The laminator 2 also comprises a pair of idle laminator rolls 22 and 23, which can also be referred to as a 'laminating nip', through which the media M and film F are conducted. Rolls 22 and 23 are suitable for applying pressure and heat to the media and film, in order to perform the laminating operation causing the film to adhere to the print media.

Downstream of the laminator rolls, the laminated media M with the film F is engaged by a pair of driving rollers 24,25 which cause it to travel through the laminator; downstream of these driving rollers, it is wound on a take-up reel 26.

The operation of the apparatus is thus as follows: media M printed and outputted by the printing device 1 is pulled into the laminator 2 by the driving rollers 24,25, and is laminated together with one or two films F by applying pressure and heat through the idle lamination rolls 22,23. The laminated media MF is then wound on the take-up reel 26.

In order to provide a more versatile apparatus, it is foreseen that each of a plurality of plots printed on a continuous web of media M in the printing device 1 can be laminated or not laminated, as desired.

For this purpose, in the embodiment shown in FIG. 1 the laminator rolls 22,23 are displaceable between a closed or laminating position and an open or inactive position, as shown by the arrows in FIG. 1, and cutting means 27 are provided in the laminator for cutting the film F upstream or downstream of the lamination rolls.

As a consequence, it is possible to let a printed plot pass through the laminator without being pressed against the film and without the film being pulled along with the plot, such that the plot is not laminated.

Therefore the web of print media is gradually wound up on the take-up reel 26, with some of it being laminated with the film F and some of it being free from film.

At the end of the printing of a plot that is also being laminated, a problem arises in that, on one hand, the printing operation generally requires that the printer makes a stop between two consecutive plots, and, on the other hand, the laminator cannot stop while laminating a plot because this could cause defects.

A solution for this problem may be outputting blank unprinted media from the printer to allow the laminating operation to continue until the end of the plot without needing a stop.

In this case, if printing is then resumed for printing the next plot, there would be an important waste of blank media, due to the distance between the outlet 10 of the printer and the inlet 20 of the laminator.

In order to avoid this waste, it is foreseen that the apparatus may draw back or rewind the blank media into the printer, without damaging the laminated plot, before the next plot is printed.

For example, the apparatus would perform the following steps for producing a first laminated plot, a second plot free from film and a third laminated plot:

start printing a first plot;

start laminating the first plot when its leading edge reaches the laminator rolls;

when the first plot is all printed, advance blank media through the printer until the laminator rolls have finished laminating the first plot;

stop the media advance in the printer and laminator;

open the laminator rolls;

cut the film;

rewind the media into the printer until substantially all the blank media has been drawn back through the printer, while the first laminated plot travels back through the open laminator rolls;

start printing the second plot and start winding again the media on the take-up reel of the apparatus, allowing the second printed plot to pass through the open laminator rolls;

stop the advance in the printer and laminator when the printer has finished printing the second plot (this stop is possible, in this case, because the second plot is not being laminated);

start printing the third plot, and start again the advance of the second plot through the laminator;

when the trailing edge of the second plot has passed through the open laminator rolls, and the leading edge of the third plot reaches the laminator rolls, close again the laminator rolls and start laminating the third printed plot.

These operations allow the whole web length of media to be printed with no media waste, with some of the plots being laminated and others being left free from film, as desired; at the end, the continuous media web with laminated and unlaminated plots is stored in the take-up reel 26 of the apparatus. All this may be done without manual intervention.

The printer informs the laminator, for each plot, if the laminating operation has to be performed or not, and the control means of the laminator cause the device to perform the necessary steps, as explained above.

Figure 2:
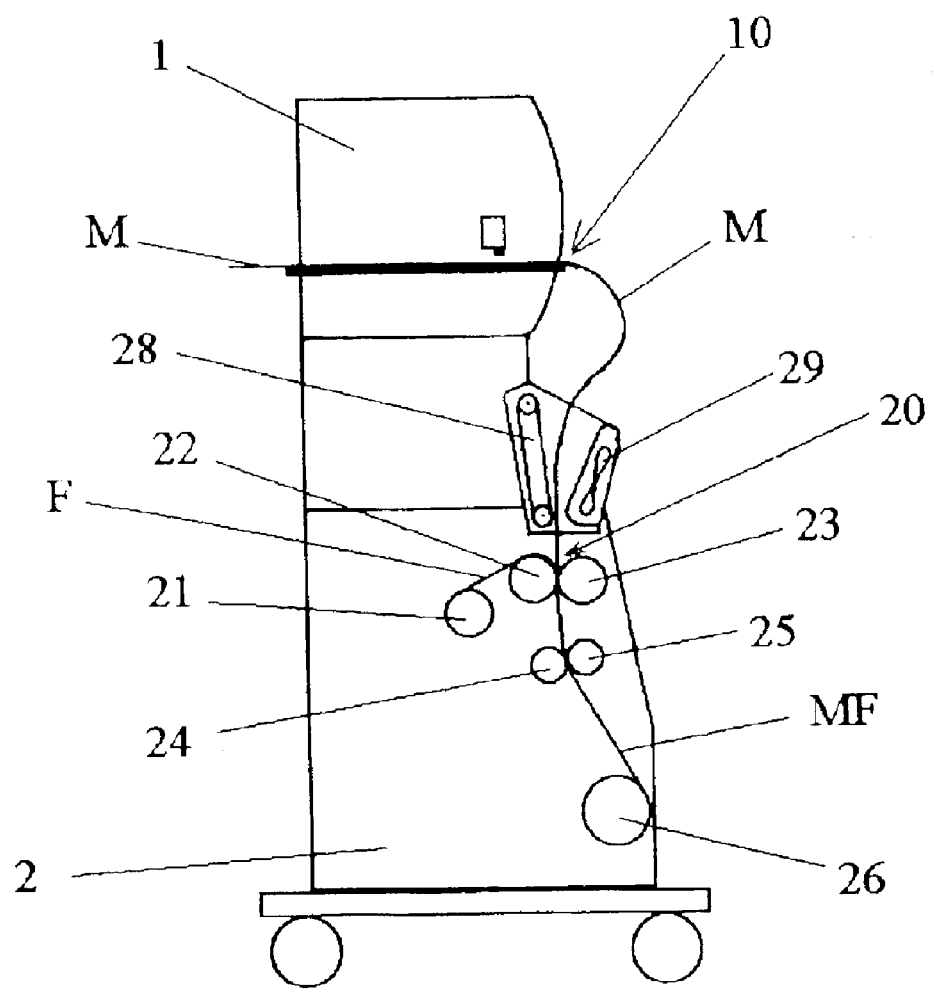
FIGS. 2 and 3 show another embodiment of the apparatus, provided with means for feeding media to the laminator.
Figure 3:
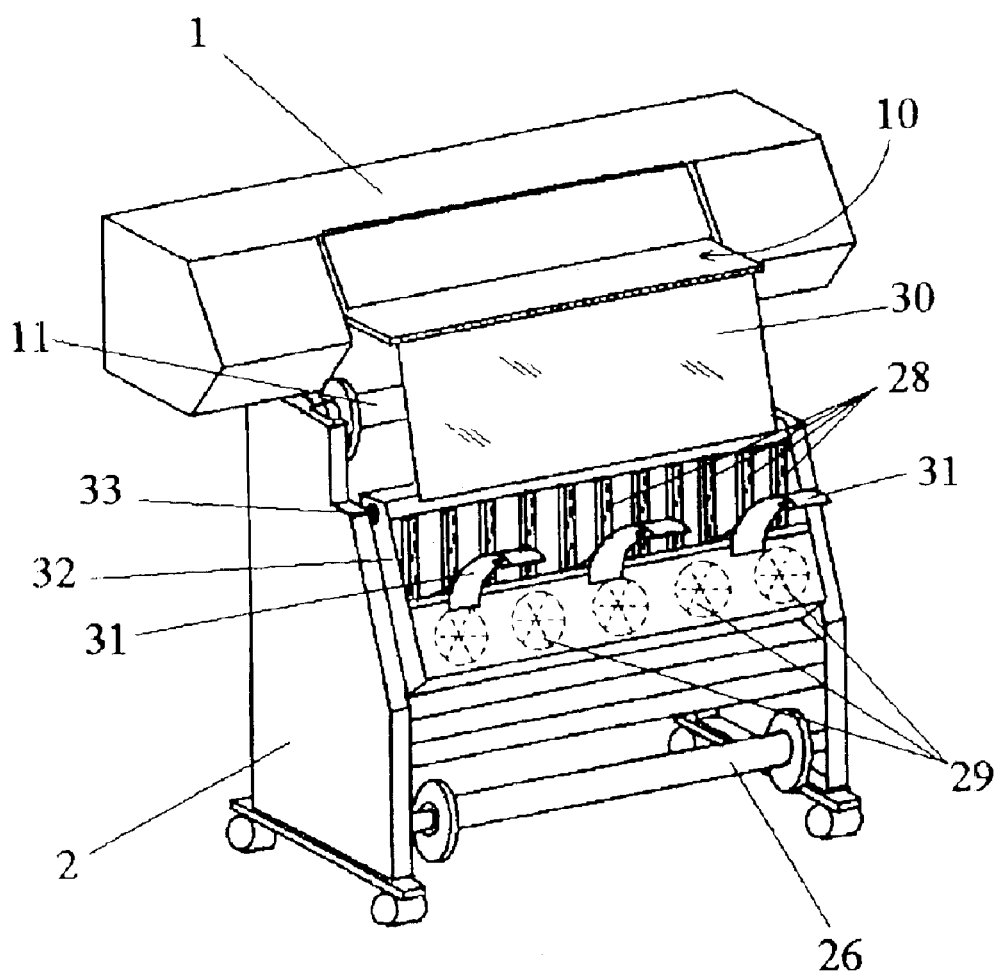

Another embodiment of the invention, according to which the apparatus is provided with feeding means for feeding the leading edge of the web of media to the laminator, for example at the beginning of the printing operation on a web of media, is shown in FIGS. 2 and 3; the apparatus has here a slightly different layout of the laminator elements, but elements that are similar to those of the previous figures have the same reference numerals and will not be described again.

FIG. 2 is a schematic view showing the position of the feeding device, which comprises conveyor belts 28 and fans 29 arranged along the media path between the outlet 10 of the printer and the inlet 20 of the laminator.

FIG. 3 shows the apparatus in perspective without any media loaded. The figure shows a blank media reel 11, from which the media is fed to the printer 1, and also the take-up reel 26 described above.

The feeding device includes a plurality of conveyor belts 28 arranged parallel to each other and with their feed path in substantially vertical direction, and a plurality of fans 29 which are arranged side-by-side and facing the conveyor belts 28, the fans and belts being arranged on opposite sides of the media path, upstream of the laminator.

Fans 29 are shown in phantom lines in FIG. 3 because they are not visible in this perspective.

The fans 29 generate an air stream such as to urge the media towards the conveyor belts 28, and the latter are set in motion to guide the leading edge of the media with an adequate orientation.

In the example, the conveyor belts 28 are made of high-friction rubber, and they are about 19 mm wide; they are spaced about 75 mm from each other (between centres), in order to provide enough support and friction surface for the flexible media and at the same time allow air flow between the belts in the region that is not covered by the media when the latter is narrower than the maximum admitted width, thus helping reduce the air flow towards the laminator.

The conveyor belts 28 could be replaced by a different type of transport means able to drive the media by friction, such as an array of wheels with a high-friction surface, e.g. made of rubber.

Similarly, the fans 29 could be replaced by other elements, e.g. a vacuum system arranged behind the conveyor belts to create a depression to attract the media towards the belts by vacuum.

The fans system, vacuum system or other air stream generating system could be located in a different position in the apparatus, and the air stream could be conducted towards the media and the belts by means of tubing.

In order to prevent the edge of the media leaving the printer from missing the space between the fans and belts, the apparatus further comprises deflectors 30 and 31 arranged at either sides of the media path upstream of the fans and belts.

The deflectors allow unattended operation of the apparatus; they are not needed if a user manually guides the leading edge of the media to enter the space between conveyor belts 28 and fans 29.

In the embodiment shown in FIG. 3, deflector 30 is a sheet of flexible material, such as plastic, removably mounted between the outlet 10 of the printer and the upper edge of the belts 28. Deflector 30 prevents the leading edge of the media from deviating towards the apparatus, where it could get caught in the media feed roll or in other parts of the device. The deflector 30 is removable in order to allow access to the inner parts of the apparatus, and it could be replaced by a rigid metal cover or other suitable housing element.

On the other side of the media path, a plurality of outer deflectors 31 prevent the media edge from falling outwards and missing the space between fans 29 and belts 28.

Deflectors 31 are sloped and curved and project outwards, as shown in FIG. 3, so as to conduct the media edge towards the space between the belts and fans: for this purpose, the base of the deflectors 31 is positioned on the housing of the fans, at about 50 mm from the belts 28, while the upper side of the deflectors 31 is spaced about 140 mm from the belts and the deflector 30.

Deflectors 31 are made of a plastic material including about 2% of an antistatic component, and are coated with a sheet of polypropylene about 0.5 mm thick for preventing the deflector from damaging the printed plot when they come into contact.

The conveyor belts 28 and fans 29 are arranged in a housing 32 (FIG. 3) which can be pivoted with respect to the apparatus by virtue of a hinge axis 33; this allows access to the inner part of the laminator 2 for maintenance and cleaning operations and in order to load the lamination film, if needed.

The deflectors 31 are mounted on the housing 32, and the lower edge of deflector 30 also may be removably fixed to it.

The operation of the apparatus with the fans and conveyors system will now be described.

Figure 4:
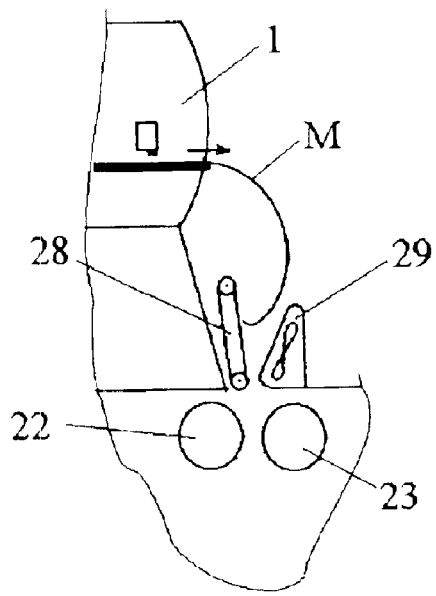
FIGS. 4 to 8 show the feeding device of the apparatus of FIGS. 2 and 3 in different steps of operation.

FIGS. 4 to 8 show different steps of the feeding operation: in FIG. 4, a leading edge of the media M leaving the printer advances towards the laminator with a degree of curling, which will vary from case to case depending e.g. on the type of media and the density of ink in the plot.

Figure 5:
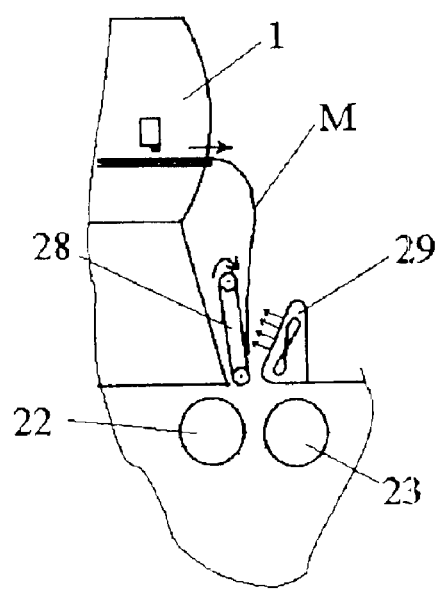

When the media edge reaches the space between the fans 29 and conveyor belts 28, the fans are powered and the belts start to advance in the direction shown by the arrows in FIG. 5, at a speed of about 100 mm/sec, thus faster than the media advance speed, such that the belts tend to pull the media edge downwards and undo the curling, and to straighten the media and exert a degree of downward pulling action thereon; this ensures a more uniform positioning of the media edge along all its width and thus avoids skew of the media when its leading edge enters the laminator.

The fans urge the media towards the belts in order to ensure enough friction between them.

Figure 6:
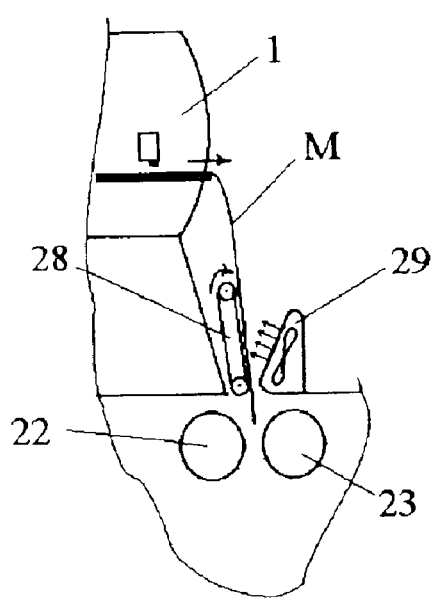
Figure 7:
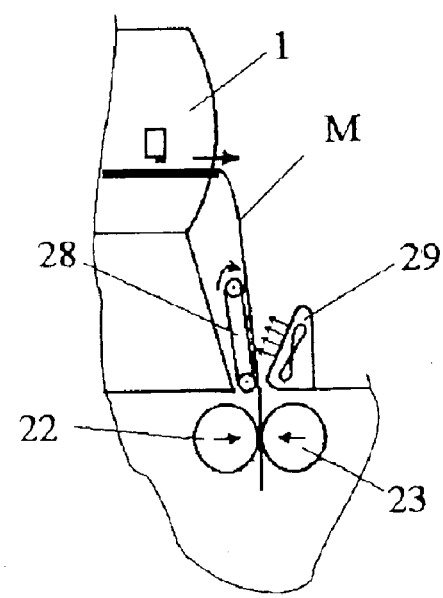

FIG. 6 shows the situation in which the leading edge of the media approaches the lamination rolls 22,23. There are then two possible ways of operation, as described hereinafter.

According to one embodiment, after the leading edge of the media travels through the laminator rolls 22,23 the rolls are closed (FIG. 7) gripping the media M and the film F, the latter not being shown in FIGS. 4 to 8 for the sake of clarity.

According to an alternative embodiment, it is also possible to close the lamination rolls before the media edge reaches them, and start laminating film without media; the conveyor belts feed the media until its leading edge enters between the lamination rolls which are already rotating.

Figure 8:
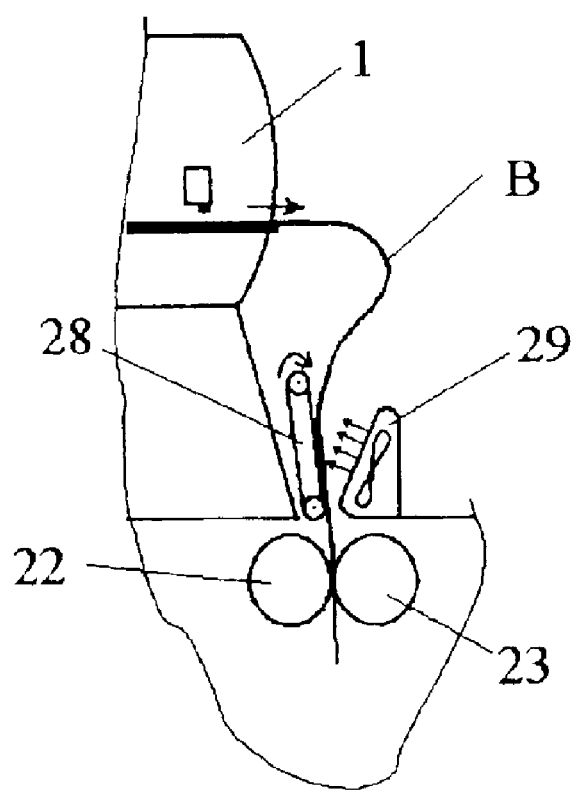

In both cases, once the edge of the media is caught between the laminator rolls, as shown in FIG. 8, the conveyor belts 28 and fans 29 work to form the media buffer B in a position upstream of the feeding system 28,29: for this purpose the conveyor belts 28 and the driving rollers 24,25 of the laminator are slowed down, such that the advance of the media in the laminator is smaller than the advance of the media in the printer, and a length of media buffer is formed.

The air stream generated by the fans 29 and the friction of the media with the belts 28 force the buffer to remain upstream of the feeding system: this allows to control the shape of the buffer and also prevents the printed side of the media from contacting the surfaces of the housing of the apparatus, throughout all the printing and laminating process.

During normal operation of the apparatus, when the printer and the laminator are working on the same plot or web of media, the fans and belts also maintain the correct angle of entrance of the media to the laminator; the fans and belts may also be used to slightly slow down the media in this region (this is done by driving the belts with a speed lower than that of advance of the media in the laminator, or stopping them completely), thereby generating a slight back tension in the media before it enters the laminator: this helps the media enter the laminator free from wrinkles.

Finally, the fans may also contribute to some extent to the drying of the printed plot before it is laminated.

The operation of the fans 29 and belts 28 is controlled by the control means of the apparatus (not shown) to be adequately synchronised with the advance of the media in the laminator, the closure of the laminator rolls 22,23 and driving rollers 24,25, and so on.

The conveyor belts 28 may be powered by means of a transmission from the driving rollers 24,25 of the laminator, or they can have an independent drive. The latter case has the advantage of easily allowing higher speeds for the belts in certain steps of operation, which is useful for avoiding skew, as explained above.

The apparatus may include sensor means to control when the leading edge of the media reaches the region of the belts and fans, or alternatively this may be estimated by counting the length of media that has left the printer.

It should be pointed out that the feeding device shown in the embodiment of FIGS. 3 and 4 may similarly be applied to any other embodiment of the apparatus, for example that described with reference to FIG. 1.

As can be seen, in the embodiments shown in the figures the laminator 2 is arranged substantially below the printer 1, with its inlet 20 on the same side of the printer outlet 10.

This layout has the advantage of taking up little floor space and allowing access to the printer for maintenance operations; furthermore, the printed side of the media is kept facing outwards and therefore prevented from contacting parts of the apparatus that may damage the plot.

Once the web of media is fed through the apparatus, a user simply needs to program in the printer the different plots to be prepared, indicating for each plot if it needs laminating or not. The apparatus will then perform the work, plot after plot, in an automated and unattended manner.

The printing apparatus with an integrated laminator may be produced and made available as a single unit, but alternatively the laminator may be produced and made available as a kit to be attached to an existing printer, with or without modifications of the latter. Such modifications may consist simply in changes in the user interface and control means of the printing device.

Apart from integrated printing and lamination of a web of media as described above, the laminator device 2 of the apparatus may also operate according to two further modes.

It can be used similarly to a stand-alone, off-line laminator, by feeding any desired plot or media to the laminating rolls 22,23, driving rollers 24,25 and take-up reel 26; and it may also be used purely as a wind-up unit for the printer 1, leaving the laminating rolls 22,23 open and inactive.

In both cases, these operation modes may be enabled by the printer, and users may interact with the laminator through the printer control panel.

What is claimed is:

1. A printing apparatus comprising a printer, a laminator device and feeding means for feeding to said laminator device, in an integrated operation, media that is outputted from said printer, said laminator device comprising lamination means which cause at least one lamination film to be applied on the media, wherein the apparatus comprises means for causing the advance of a portion of media through the laminator device while maintaining inactive said lamination means, in order to perform lamination only on selected portions of the print media;

wherein said means for causing the advance of a portion of media through the laminator device while maintaining inactive said lamination means, comprise cutting means for cutting said lamination film; and which further comprises means for outputting unprinted media from the printer, and means for drawing back media from the laminator device towards the printer after cutting the lamination film.

2. A method for printing and laminating media, comprising printing on a media in a printer, feeding at least part of said print media to a laminator device in an integrated operation, said laminator device comprising lamination means, and performing lamination only on selected portions of said print media by causing the advance of a portion of media through the laminator device while maintaining inactive said lamination means of said laminator device.

3. A method for printing and laminating media, comprising printing on a media in a printer, feeding in an integrated operation said print media to a laminator device provided with lamination means which cause at least one lamination film to be applied on the media, and selectively cutting said lamination film in order to selectively maintain inactive said lamination means of said laminator device and perform lamination only on selected portions of said print media.

4. A method as claimed in claim 3, further comprising outputting unprinted media from the printer to allow lamination of a selected portion of media to be completed, cutting the lamination film once lamination of said selected portion is completed, and then drawing back media from the laminator device towards the printer.

* * * * *